United States Patent

French et al.

[11] Patent Number: 6,031,685
[45] Date of Patent: Feb. 29, 2000

[54] INFORMATION STORAGE SYSTEMS COMPRISING A LIQUID BEARING MAINTAINED BY ADSORPTION ISOTHERM

[75] Inventors: William French, Cardiff; James H. Smith, Woodside, both of Calif.

[73] Assignee: Seagate Technology, Inc., Scotts Valley, Calif.

[21] Appl. No.: 08/891,492

[22] Filed: Jul. 11, 1997

[51] Int. Cl.[7] .................................. G11B 5/60; G11B 5/71
[52] U.S. Cl. ............................... 360/97.01; 360/97.02; 428/695
[58] Field of Search ............................ 360/97.01, 97.02, 360/97.03, 102, 103, 135; 428/694 TF, 694 TP, 694 BP, 695, 900

[56] References Cited

U.S. PATENT DOCUMENTS

| | | | |
|---|---|---|---|
| 4,626,941 | 12/1986 | Sawada et al. | 360/97.02 |
| 4,789,913 | 12/1988 | Gregory et al. | 360/97.03 |
| 5,097,368 | 3/1992 | Lemke et al. | 360/97.02 |
| 5,138,506 | 8/1992 | Beck et al. | 360/97.03 |
| 5,193,046 | 3/1993 | Lemke et al. | 360/97.02 |
| 5,202,803 | 4/1993 | Albrecht et al. | 360/97.02 |
| 5,267,104 | 11/1993 | Albrecht et al. | 360/97.02 |
| 5,278,711 | 1/1994 | Gregory et al. | 360/103 |
| 5,285,337 | 2/1994 | Best et al. | 360/97.02 |
| 5,317,463 | 5/1994 | Lemke et al. | 360/97.02 |
| 5,331,487 | 7/1994 | Gregory et al. | 360/97.02 |
| 5,346,518 | 9/1994 | Baseman et al. | 360/97.02 |
| 5,526,204 | 6/1996 | French et al. | 360/97.02 |
| 5,543,984 | 8/1996 | Itoh | 360/102 |
| 5,559,650 | 9/1996 | Repphun et al. | 360/97.02 |
| 5,612,838 | 3/1997 | Smith et al. | 360/102 |
| 5,618,639 | 4/1997 | Ohno et al. | 360/128 |
| 5,680,273 | 10/1997 | Wong | 360/97.02 |
| 5,742,449 | 4/1998 | Gregory et al. | 360/97.02 |
| 5,757,581 | 5/1998 | Yanagisawa | 360/97.02 |
| 5,820,964 | 10/1998 | Nakakawaji et al. | 360/103 |
| 5,835,305 | 11/1998 | Hamaguchi et al. | 360/103 |

FOREIGN PATENT DOCUMENTS

| | | |
|---|---|---|
| 302606B1 | 9/1993 | European Pat. Off. . |
| 367510B1 | 1/1995 | European Pat. Off. . |
| WO94/11878 | 5/1994 | WIPO . |
| WO94/11879 | 5/1994 | WIPO . |

*Primary Examiner*—David L. Ometz
*Attorney, Agent, or Firm*—Flehr Hohbach Test Albritton & Herbert LLP

[57] ABSTRACT

Information storage systems having a liquid bearing of at least 2 molecular layers on the surface of a rigid storage medium are provided. The liquid bearing lubricant of the subject invention has a low viscosity, high vapor pressure organic liquid. The liquid bearing is maintained on the surface of the rigid storage medium by vapor phase transfer, where the gaseous environment of the rigid storage medium is maintained in a saturated state with respect to the low viscosity, high vapor pressure organic liquid of the liquid bearing. Also provided are novel read/write heads for use in the subject information storage systems.

18 Claims, 10 Drawing Sheets

Drag Test Data $\Delta T = 0$ means saturation
$\Delta T = -5°C$ means liquid vapor pressure is below saturation

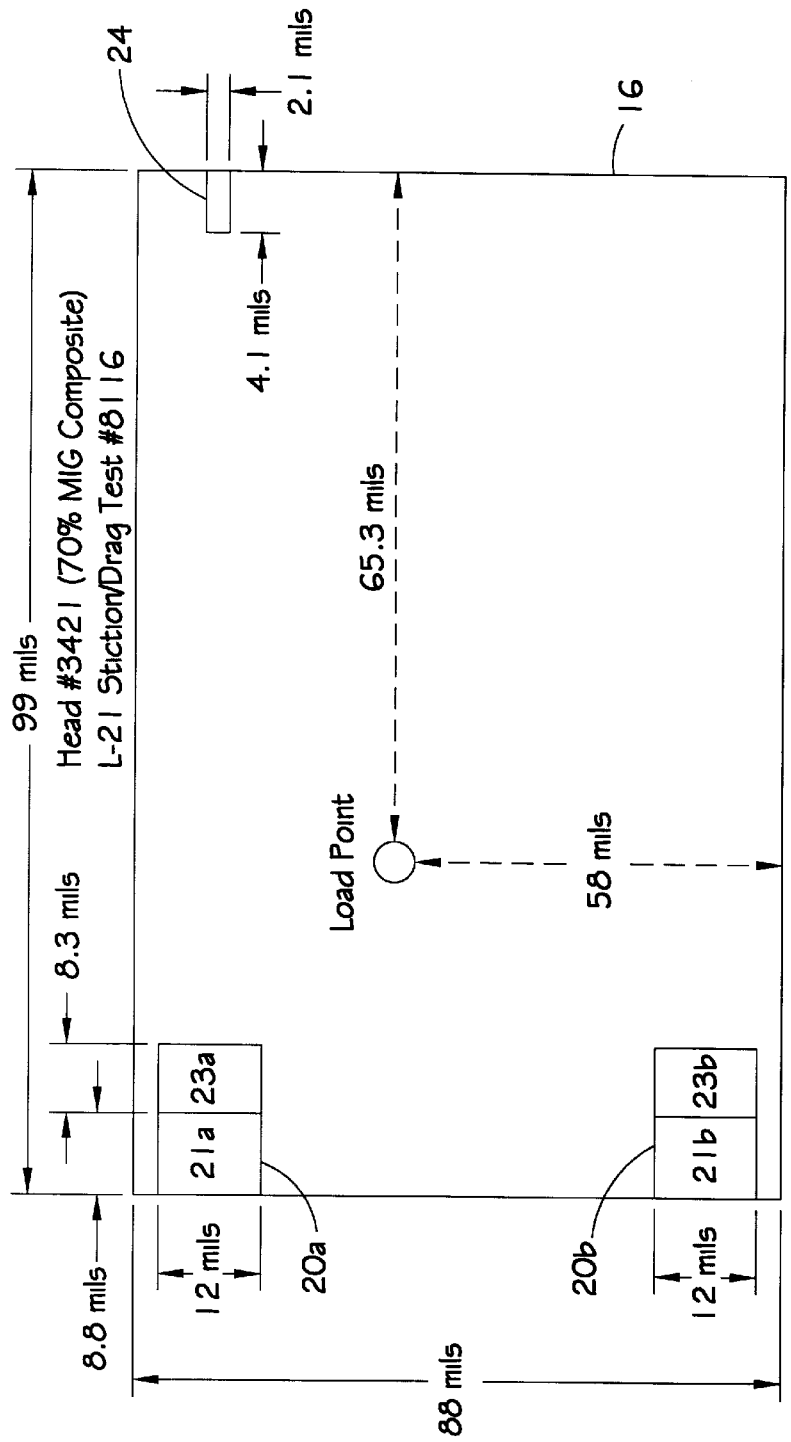
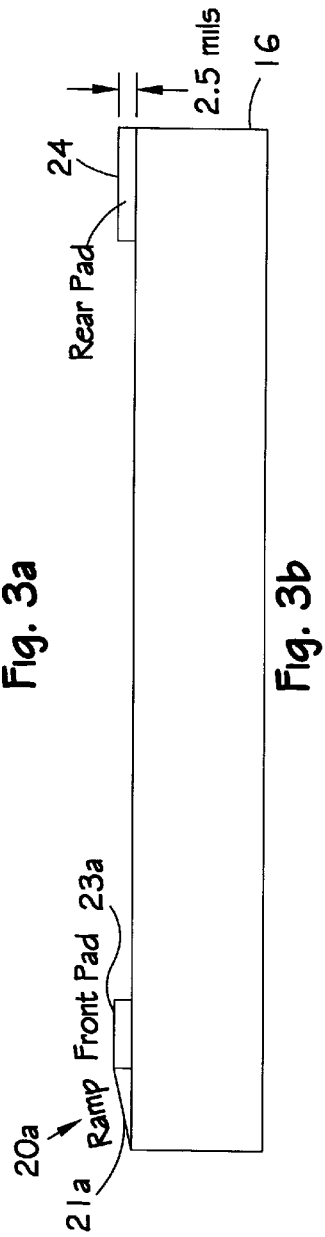
Fig. 3a
Fig. 3b

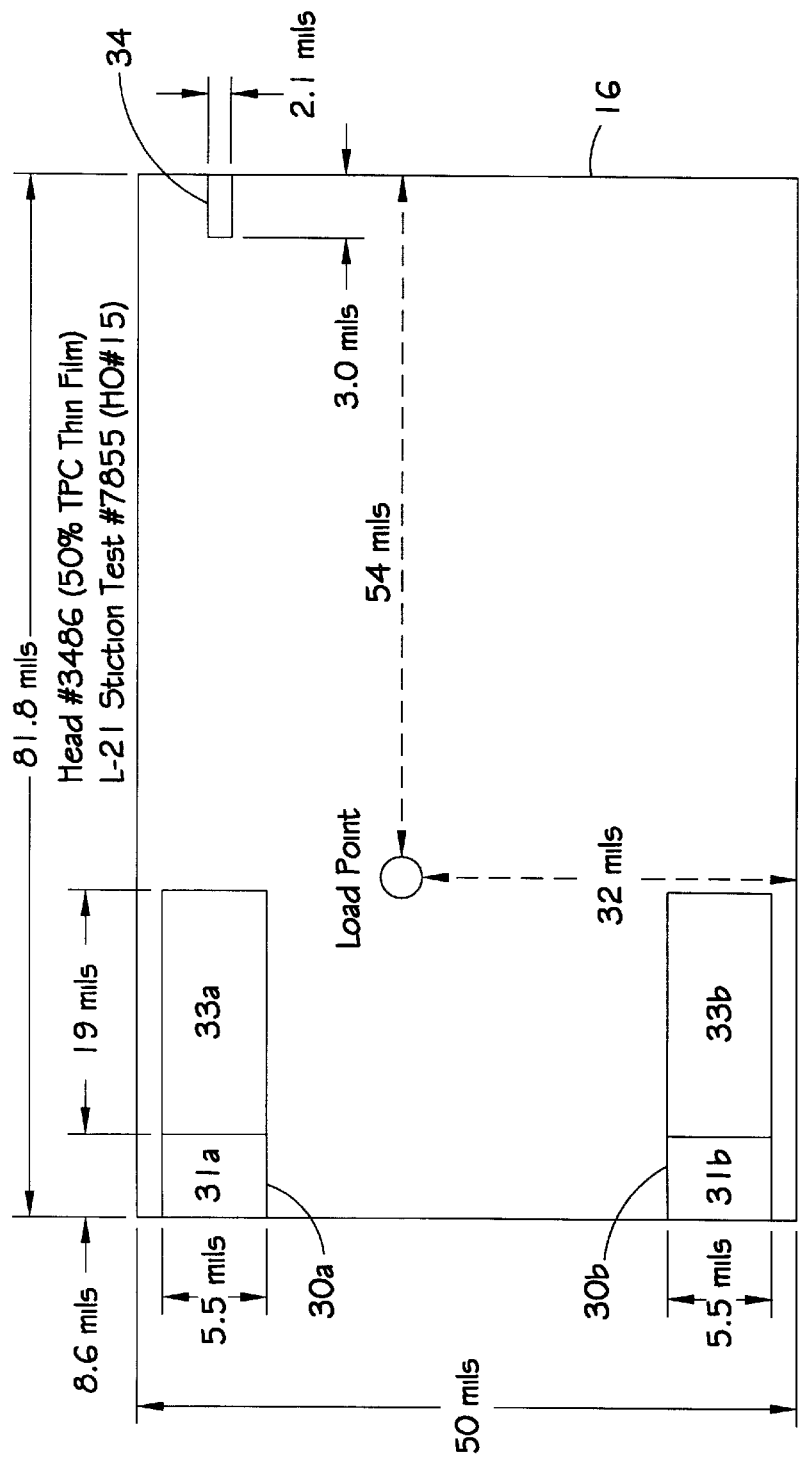
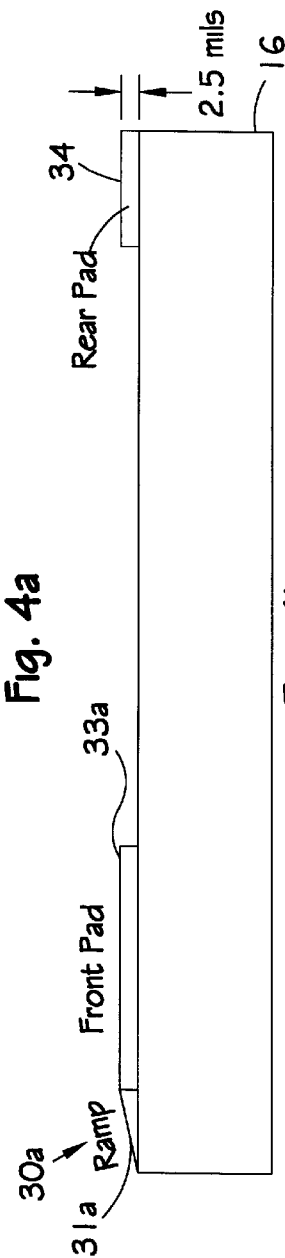
Fig. 4a
Fig. 4b

Optics Geometry

INFORMATION STORAGE SYSTEMS COMPRISING A LIQUID BEARING MAINTAINED BY ADSORPTION ISOTHERM

FIELD OF THE INVENTION

The field of this invention is information storage systems. More particularly, the invention pertains to storage systems employing a liquid bearing which is maintained by adsorption isotherm.

BACKGROUND OF THE INVENTION

In information storage systems such as disk drives found in personal computers and other data processing devices, a rigid magnetic storage medium, usually in the shape of a disk, is moved relative to a transducer comprising a read/write head which provides for information introduction to and/or retrieval from the magnetic storage medium. In the design of such devices, it is most desirable from a magnetic standpoint to have the read/write head continually touch the surface of the disk during movement to maximize the signal quality, so that the head slides over the disk surface. However, the magnetic benefits of such a design are outweighed by the wear and material interactions caused by such an arrangement, and such interactions lead to poor system reliability and performance. Accordingly, during movement of the disk medium relative to the read/write head, a certain minimal distance is maintained between the head and the disk medium, which is known in the art as the "fly height." Although a certain "fly height" is necessary, there is a continued interest in the development of designs that provide for lower fly heights.

In order to ensure that the read/write head remains separated from the disk surface during operation, air bearing disk drives have been developed in which the read/write heads move over the disk surface on a thin layer of air. Although air bearing devices provide for the necessary separation of the head from the disk surface, the minimal fly height that is achievable with such air bearing configurations is in the range of 2 to $3\mu$ inches.

In an effort to provide for even lower fly heights, disk drive configurations comprising liquid bearings on the surface of the disk have been developed. In such disk configurations, the read/write head moves through the liquid bearing present on the surface of the disk. Use of liquid bearings generally allows the read/write head to be positioned closer to the surface of the disk than is achievable with air bearings, with the distance achievable usually being less than $2\mu$ inch. Other advantages provided by liquid bearings include high shock and vibration resistance, reduced stiction, improved wear, long life, the opportunity to have a smooth disk surface, and the like.

Despite the potential benefits of liquid bearings in information storage systems, maintenance of the liquid bearing on the surface of the disk can be difficult, particularly for those disk drives which are not kept in a stable position, such as those found in portable or laptop personal computer devices. Thus, typical liquid bearing devices include a means for maintaining a liquid layer on the surface of the disk, such as a nozzle, wick and the like. Although such configurations succeed in maintaining the lubricant layer on the surface of the disk, there are disadvantages associated with the presence of the additional elements required to maintain the liquid bearing. For example, where a transport wick is employed to deposit fluid on the surface of the disk, the wick can create drag on the disk which then must be compensated for in the drive's control electronics and spin motor, which is undesirable. Furthermore, it is difficult to manufacture such devices because of the complexity of the fluid applications means. In addition, for practical purposes such devices are limited to single disk configurations.

Thus, there is interest in the development of new liquid bearing configurations which do not require the presence of a wick or other liquid bearing maintenance means and yet provide for the presence of a stable liquid bearing on the disk surface.

Ideally, such configurations should provide for fly heights of less than $1\mu$ inch.

RELEVANT LITERATURE

U.S. Pat. Nos.: 5,559,650; 5,097,368; 5,193,046; and 5,317,463 describe information storage systems comprising liquid bearings. U.S. Pat. Nos. 4,626,941 and 4,789,913, as well as EP 0 367 510 B1 disclose disk drive configurations in which a thin liquid bearing is maintained on the surface of the disk to reduce problems related to stiction.

OBJECTS AND SUMMARY OF THE INVENTION

Accordingly, it is an object of the present invention to provide an information storage system employing a liquid bearing.

More particularly, it is an object of the present invention to provide a liquid bearing on the surface of a rigid storage medium which is maintained by vapor phase transfer and an adsorption isotherm.

Another object of the present invention is to provide a liquid bearing capable of achieving fly heights less than $1\mu$ inch.

A related object of the present invention is to provide a storage system suited for use with the liquid bearing and without the need for a wick, nozzle, or other fluid application means.

These and other objects and advantages are achieved by the invention herein where an information storage system comprising a liquid bearing on the surface of a rigid storage medium is provided. In the subject invention, the liquid bearing comprises film of a low viscosity, high vapor pressure liquid, which is maintained through vapor phase transfer as an absorbed multi-molecular thick layer on the surface of the storage medium. To maintain a liquid bearing of sufficient thickness on the surface of the disk, the gaseous phase environment of the storage medium is saturated with respect to the liquid that makes up the liquid bearing. Also provided is a read/write head particularly suited for use with the liquid bearing of the subject invention. The subject storage systems provide for a number of advantages, including fly heights of less than about $1\mu$ inch.

BRIEF DESCRIPTION OF THE FIGURES

FIGS. 3*a* and 3*b* are enlarged, bottom plan and side views, respectively, of one embodiment of a read/write head configuration (70% MIG Composite) suitable for use with the liquid bearings according to the subject invention.

FIGS. 4*a* and 4*b* are enlarged, bottom plan and side views, respectively, of an alternative embodiment of a read/write head configuration (50% TPC Thin Film) suitable for use with the liquid bearings according to the subject invention FIG. 5 provides PW50 performance data for a spin stand start stop test using FC-77 as the liquid bearing in accordance with one embodiment of the present invention.

DESCRIPTION OF THE SPECIFIC EMBODIMENTS

An information storage system comprising a liquid bearing of multi-molecular layer thickness is provided on the surface of a rigid storage medium. The liquid bearing comprises a low viscosity, high vapor pressure liquid which is maintained as a layer of sufficient thickness on the surface of the storage medium through vapor phase transfer. To provide for the liquid bearing, the gaseous phase environment of the storage medium is maintained in a saturated state with respect to the liquid of the liquid bearing. Also provided is a read/write head particularly suited for use in the subject storage systems.

Of particular importance is the liquid bearing on the surface of the rigid storage medium, where the liquid bearing is maintained on the surface of the medium by vapor phase transfer. To maintain the liquid bearing on the surface of the storage medium, the gaseous environment or atmosphere of the storage medium will be saturated with respect to the liquid which makes up the liquid bearing. Because the gaseous environment is saturated with molecules of the liquid bearing, the liquid bearing is initially deposited through vapor phase transfer and adsorption of the liquid bearing molecules from the gaseous environment onto the surface of the storage medium. The molecules adsorb onto the surface in a multilayer of liquid bearing molecules by a process which may be described by non-Langmuir type adsorption isotherm theory. The multi-molecular layer is comprised of at least two molecular layers.

Figure 1:
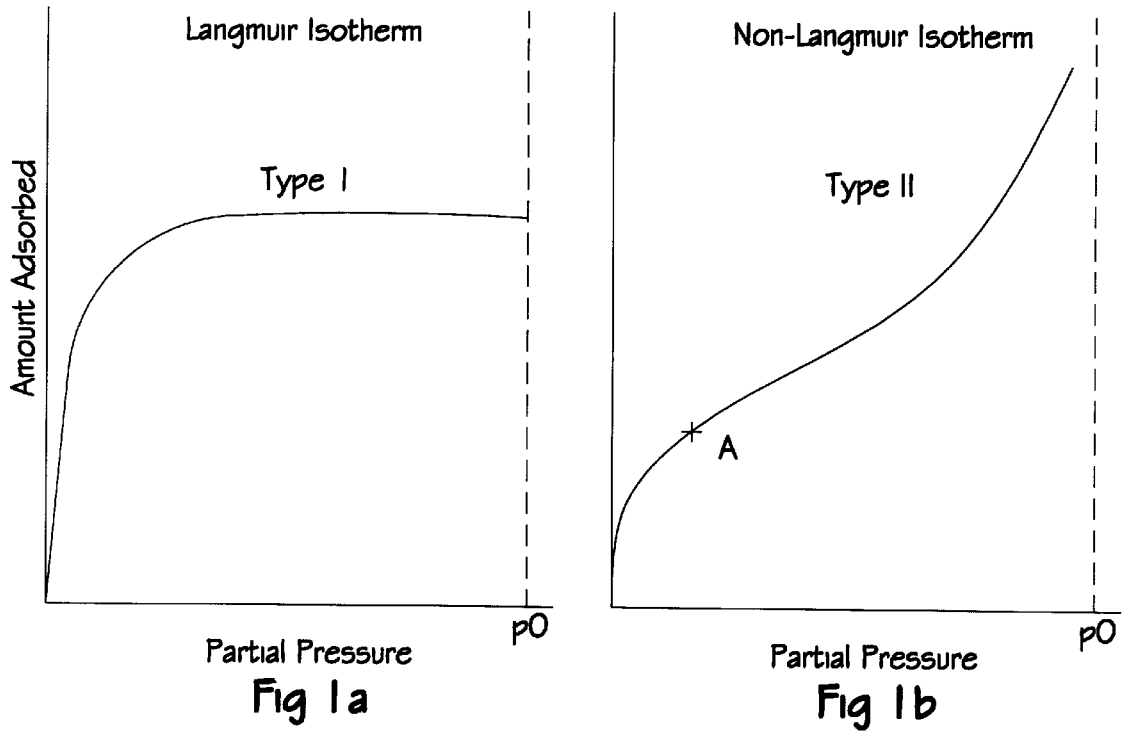
FIGS. 1*a* and 1*b* show the difference between Langmuir and non-Langmuir adsorption isotherms.

Two types of adsorption isotherms are shown in FIGS. 1a and 1b. A Langmuir adsorption isotherm implies, by definition, that only a mono-layer of atoms is adsorbed on the surface of the disk medium (i.e. the atomic coverage is limited to one atomic layer). A typical Langmuir adsorption isotherm is shown in FIG. 1a, where the vertical (y) axis is the amount of liquid adsorbed on the surface, the horizontal (x) axis is the partial pressure on the liquid vapor, and the saturation vapor pressure of the liquid is $P_0$. The amount of liquid adsorbed levels off as the partial pressure of the liquid increases, because the surface becomes covered with one atomic layer and additional layers cannot form.

Conversely, in a non-Langmuir adsorption isotherm, the coverage is not limited to one atomic layer, and many atomic layers will form as the vapor phase concentration of the adsorbed material approaches saturation, as shown in FIG. 1b. In fact, one atomic layer coverage is reached at about point A in FIG. 1b. Most adsorption isotherms are of the non-Langmuir type. Further description can be found in *Physical Chemistry of Surfaces*, by A. W. Adamson, 5th edition, John Wiley & Sons, Inc., New York, 190, Chapter XVI and pages 595–601, and 609–614, the disclosure of which is incorporated herein by reference.

The thickness of the liquid bearing film formed by adsorption on the surface of the storage medium will be at least two molecular layers. Of additional importance is the thickness of the liquid bearing when the head is in operation, and this measurement is referred to in the art as the "head-disk spacing." According to the present invention a thickness of the liquid bearing of at least two molecular layers will separate the head from the disk (i.e. the storage medium) during operation.

Choice of the particular liquid employed for the liquid bearing material is critical to the subject invention. The liquid bearing material will be an organic, low viscosity and high vapor pressure material. At 25° C., the viscosity for suitable liquid bearing materials will range from about 0.1 to 10 cP, usually from about 0.5 to 5 cP, and most preferably from about 2 to 4 cP. Suitable liquids will also be high vapor pressure liquids, where the vapor pressure will typically range from about 0.001 to 500 Torr, more usually from about 0.01 to 100 Torr and most preferably from about 0.05 to 5 Torr, where the vapor pressure is measured at 25° C. Suitable liquids for use in the subject invention include, but are not limited to, non-Newtonian liquids, as described in Chemical Engineer's Handbook, Fifth Edition, Robert H. Perry et al., eds. (1973) pp. 5–38 to 5–40. Non-Newtonian liquids finding use in the subject invention are those liquids that are capable of forming through vapor phase transfer a multi-atomic layer on the surface of the storage medium. Liquids that find use include those non-Newtonian liquids disclosed in U.S. Pat. No. 5,612,838 the disclosure of which is incorporated herein by reference, with the proviso that the liquids finding use in the subject invention need not have the surface tension characteristics specified in this reference, since a wick or other liquid bearing maintenance means is not required in the subject invention. Thus, non-Newtonian liquids finding use will generally be organic, having a molecular weight ranging from about 100 to 1000 dal. Preferably, hydrocarbon liquids having a molecular weight ranging from about 100 to 250 dal, and fluorocarbon liquids having a molecular weight ranging from about 250 to 700 dal are used. The boiling point of the subject liquids will range from about 50 to 400° C., and more usually from about 150 to 250° C., while the freezing point or the pour point of the subject liquids will not be higher than about −10° C. According to the invention, hydrocarbon liquids will be comprised of about 8 to 30 carbon atoms and the structure of the liquids may be linear or branched, with one or more heteroatoms, and usually no more than 4 heteroatoms.

The heteroatoms will typically be oxygen, nitrogen, and/or halogens including fluorine and chlorine, with fluorine being preferred. High substitution of fluorine atoms will substantially reduce the boiling point of the liquid and the preferred number of carbon atoms will usually be between 6 and 12. Specific liquids of interest that find use in the subject invention include: 2,2,4,4,6,8,8-heptamethylnonane, the PFPE Ausimont D02TS, Fluorinerts, and the like, as shown in Table 1 below:

TABLE 1

| Liquid Bearing Material | Viscosity (cP) at 25° C. | Boiling Point (° C.) | Trade Name | Manufacturer |
| --- | --- | --- | --- | --- |
| Perfluoropoly-ether(PFPE) | 3.19 | 165–230 | DO2TS | Ausimont |
| Perfluoro tertiary amine | 4.11 | 155 | FC-40 | 3M Corp. |
| $C_8F_{18}$ + perfluorinated ether | 1.4 | 97 | FC-77 | 3M Corp |
| n-Decane ($C_{10}H_{22}$) | 0.87 | 174 | — | Aldrich Chemical |
| Perfluoropolyether | 1.43 | 110 | HT-110 | Ausimont |
| Perfluoropolyether | 0.84 | 70 | HT-70 | Ausimont |
| $C_6F_{14}$ | 0.4 | 56 | FC-72 | 3M Corp |
| Perfluoropolyether | 2.46 | NA | LS-155 | Ausimont |
| Perfluoropolyether | 3.8 | NA | L-9910 | Ausimont |
| 2,2,4,4,6,8,8-hepta-methylnonane | 3.33 | 240 | 12, 851-1 | Aldrich Chemical |
| Perfluoropolyether | 65.5 | NA | GPL-102 | DuPont |

Preferably, the liquid bearing material will be the PFPE DO2TS or HT-70, the fluorocarbon FC-77 or the hydrocarbon 2,2,4,4,6,8,8-heptamethylnonane.

The liquid bearing may comprise a single type or a plurality of liquids. For example, PFPEs are a complex mixture. In addition to the liquid, other various agents may be included which contribute desirable properties to the liquid bearing. For example, these agents include antioxidants, such as 2,6-di-t-butyl-4-methylphenol (BHT, CAS #128-37-0), which has been found to significantly reduce oxidation with hydrocarbon fluids, as further described in U.S. Pat. No. 5,612,838, the disclosure of which is incorporated herein by reference.

Because the liquid bearing is maintained on the surface of the storage medium by vapor phase transfer, a means for maintaining a liquid bearing on the surface of the storage medium, such as a wick, nozzle and the like, is not needed in the present storage system. The present storage systems are designed so that saturation of the gaseous environment of the storage medium with molecules of the liquid bearing material is maintained at least over the temperature range of operation and, preferably, at least over the temperature range of storage. In accordance with industry standards, the temperature of operation will generally range from about 5 to 55° C. and temperature of storage may range from about –40 to 70° C. To maintain the requisite saturation of the gaseous environment with respect to the liquid bearing material, generally a sufficient volume of the liquid bearing material will be present in the system at any given time so that the gaseous environment remains saturated with respect to the liquid bearing material. Conveniently, the housing of the storage system may include one or more reservoirs for the liquid bearing material. As necessary, additional liquid bearing material may be introduced into the system by any convenient means. Accordingly, the system may comprise an entry port or other liquid bearing material introduction means, the particular means employed being a matter of convenience and not critical to the invention. In order to reduce or substantially eliminate the need to introduce additional liquid bearing material into the system, the housing comprising the storage medium and other elements of the system may be sealed. Where the housing is sealed, there will be substantially no gaseous or fluid communication between the internal volume and external environment of the housing.

Specifically, the subject information storage systems will comprise at least a head-disk assembly and control electronics (not shown) which may be employed with a computer, printer or fax machine (not shown) or other host system. The information storage systems of the subject invention can comprise a variety of configurations, where many different configurations are known in the art, including those described in U.S. Pat. Nos. 5,097,368; 5,193,046; 5,317,463; 4,626,941 and 4,789,913, as well as EP0 367 510 B1.

Figure 2:
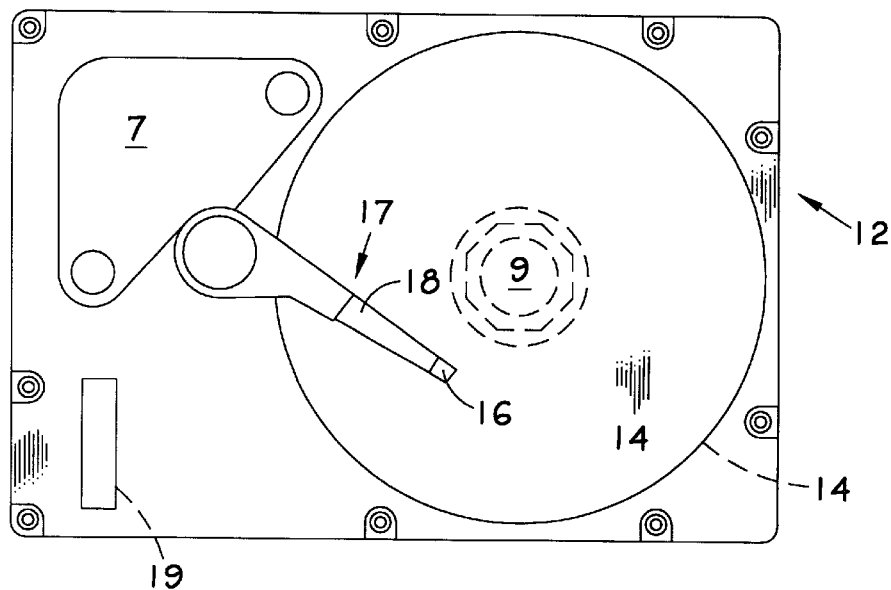
FIG. 2 is a top plan, cutaway view of a storage system in accordance with the present invention.

An exemplary data storage system is shown in FIG. 2. Therein is provided a representation of one embodiment of a storage system according to the subject invention, in which a liquid bearing of at least two molecular layers is maintained on the surface of the storage medium without the use of a wick or other mechanical fluid maintenance means. As shown in FIG. 2 the storage system generally includes a sealed housing 12, a storage medium 14 which is usually in the form of a disk, a read/write head 16, and an actuator assembly 17 having an actuator arm 18 for positioning the read/write head 16 disposed at the end of the actuator arm 18 over the surface of the storage medium 14. Multiple read/write heads may be employed although not shown in the plan view. A spindle motor 9 is provided which mounts the disk or disks–and spins them at a constant speed. A header assembly 19 is provided for transferring electronic signals to and from a motor 7 which positions the actuator and the read/write head 16 as data is transferred to and from the disk 14. Also included in the housing 12 is a liquid bearing material (not shown) which is disposed on the surface of the storage medium and throughout the interior of the housing.

Preferably, the liquid bearing will not significantly dilute or contaminant lubricants present in the spindle motor 9. It will be appreciated by those of skill in the art that the storage system just described does not employ a wick assembly which are generally comprised of complicated structures. According to the present invention such data storage systems have been prepared and are fully functional disk drives, which have been servo written while maintaining the liquid bearing.

Preferably, the surface of the disk 14 will be smooth, polished and not textured as is commonly found in prior art (see *Magnetic Slider/Rinid Disk Substrate Materials and Disk Texturing Techniques—Status and Future Outlook*, by B. Bushan, Adv. Info. Storage System, Vol. 5, pp. 175–209, 1993). Additionally, the present invention eliminates the need for a separate textured data and landing zones, since the stiction, friction, and wear during start-stop cycles are significantly reduced by the liquid bearing of the present invention. The desired roughness average ($R_a$) will be between 4 and 8 Å, as measured by an Atomic Force Microscope (AFM).

FIGS. 3a and 3a are enlarged, bottom plan and side views, respectively of one embodiment of a read/write head 16 particularly suited for use with the liquid bearing of the subject invention. The head 16 generally includes a pair of two front bearing pads 20a and 20b and one rear bearing pad 24 each carried on the head 16. The rear bearing pad 24 carries a read/write element, and the element can be any type known in the art, such as inductive thin film, MIG or MR. The rear pad 24 can be in center or on either side of the head 16, and can be formed as either a square or rectangular shape. Preferably, the rear pad 24 is long and narrow with an area of about 6 to 8 sq. mils.

As shown with reference to FIG. 3b, the front bearing pads 20a and 20b include a bearing ramp portion 21a and 21b, and a flat pad portion 23a and 23b. The ramp portion 21a and 21b is slanted at an angle and operates to raise the head-disk spacing and reduce drag. Preferably, the front pads 20a and 20b are placed on the side of the head 16, equal distance form the edges of the head. In the exemplary embodiment, the area of the ramp portions 21a and 21b and flat pad portions 23a and 23b of the front bearing pads are approximately equal.

An alternative embodiment of a read/write head 16 is shown in FIGS. 4a and 4b. Front pads 30a and 30b include ramp portions 31a and 31b, and flat pad portions 33a and 33b. The rear bearing pad 34 carries a read/write element, and the element can be any type known in the art, such as inductive thin film, MIG or MR. The rear pad 34 can be in center or on either side of the head 16, a nd can be formed as either a square or rectangular shape. Preferably, the rear pad 34 is long and narrow with an area of about 6 to 8 sq. mils.

Of particular advantage, the low viscosity of the liquid bearing material permits the construction of large bearing pads, especially the front pads. Such larger sized pads provides for better strength and durability and easier manufacturability. It should be noted, however, that the present invention is not limited to the heads described herein, but may be practiced with various types of heads.

EXPERIMENTAL

The following tests demonstrate the capabilities of the present invention and such examples are offered by way of illustration and not by way of limitation.

Spin Stand Tests

A sealed spin stand, as known in the art, was used for many tests. The spin stand consists of a hollowed out block of aluminum about 25×15×10 cm, fitted with a tight fitting lid and an O-ring seal, and an exterior spindle motor driving a shaft in a bearing mounted in the bottom of the tester. The disk is mounted on a spindle attached to the shaft inside the tester. The spindle is coupled to a variable speed spindle motor to provide rotation of the spindle. The tester also has a mounting arm for the head and flexure assembly, which is mounted so that the radius of the head on the disk can be adjusted from outside the tester.

Contact Start-Stop Tests

Contact start-stop (CSS) tests were performed in the spin stand using the fluorocarbon Fluorinert FC-77 as the liquid bearing material in the storage system of the present invention. The spindle motor was operated in a start-stop mode by a data acquisition system. The spindle motor rotation speed went from 0 to 3040 rpm in about 5 sec. After a preset time interval, which was gradually increased from about 0.25 to 1 hour during the course of the experiment, the data acquisition system kept the spindle motor running at 3040 rpm and a high frequency (9 MHz) data track was written to the disk. The readback amplitude was measured with a digital oscilloscope and recorded by the data acquisition system. Then a low frequency (0.1 MHz) track was written to the disk and the peak width at half height (known in the art as "PW50," see B. K. Middleton, IEEE Trans. Magn., MAG-2 (1), 225 (1996) and B. K. Middleton and J. J. Miles, ibid., MAG-27 (6), 4954 (1991), the disclosures of which are herein incorporated by reference) was measured. The value of the PW50 is very sensitive to the head-disk spacing and small changes in PW50 during a test indicate that the head-disk spacing has changed (the PW50 increases if the head-disk spacing increases).

Figure 5:
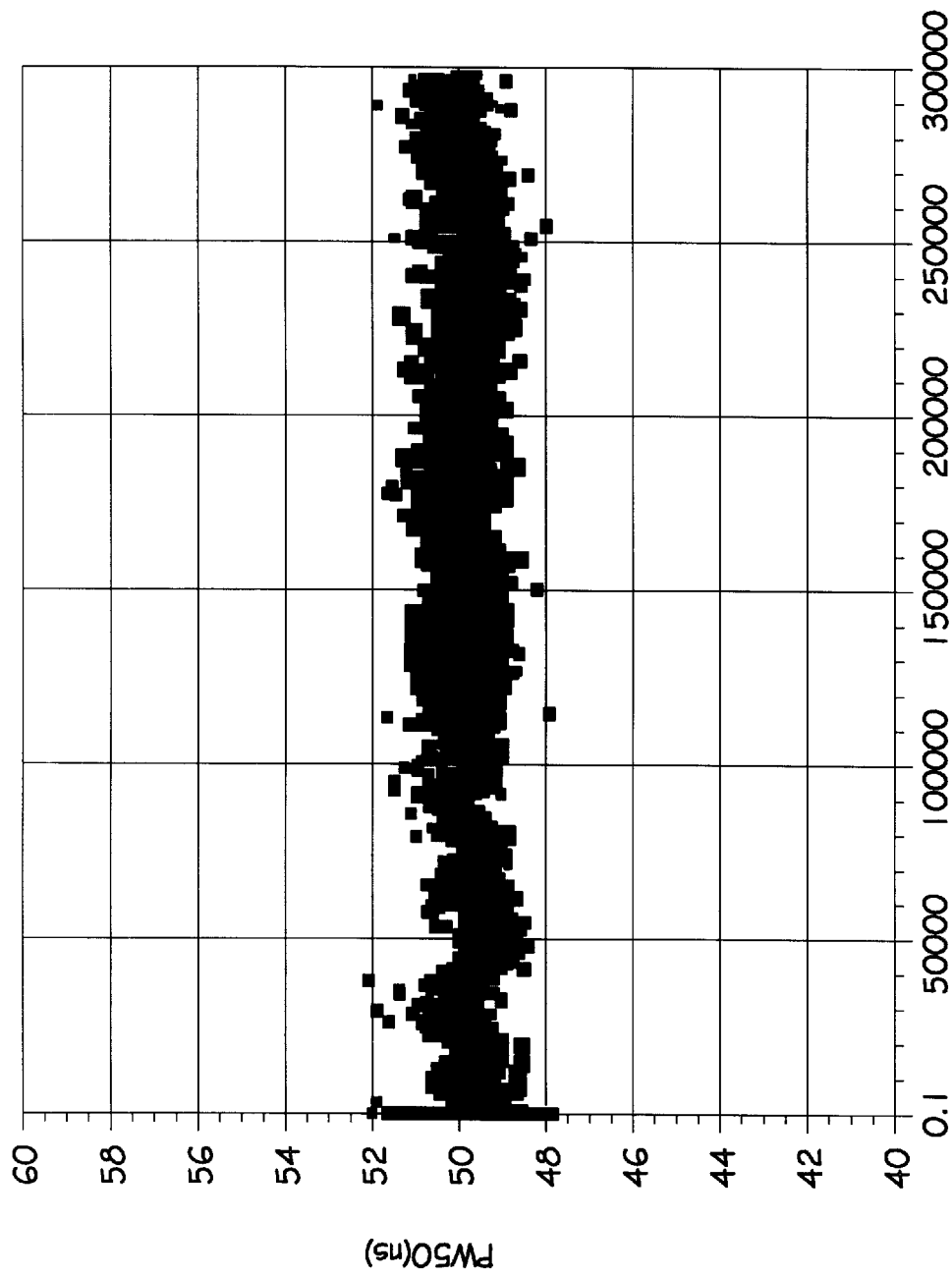

FIG. 5 graphically illustrates the test data, plotting variations in PW50 over 300,000 CSS cycles. As shown in FIG. 5, the head-disk spacing did not materially change for over 300,000 CSS cycles.

Stiction and Drag Measurement

To demonstrate the effect of the vapor phase transfer of the lubricant, stiction and drag measurements were made, using a similar test stand to that described above.

In this case, the spindle motor was a NuPhaze MegaSISS unit which could be operated over a very wide range of rotational speeds (0.2 to 3600 rpm). The test head was mounted on a standard flexure, which was mounted on the strain gauge arm with 4 strain gauges in a Wheatstone bridge circuit. An amplifier and a strip chart recorder were used to measure and record the drag on the head as the disk rotates slowly at about 0.5 RPM, giving a linear velocity of 0.005 in/sec. The liquid bearing fluid is added to the tester and the system is started. Initially, the lid is removed from the tester. In this experiment, the liquid bearing was Fluorinert FC-77.

Figure 6:
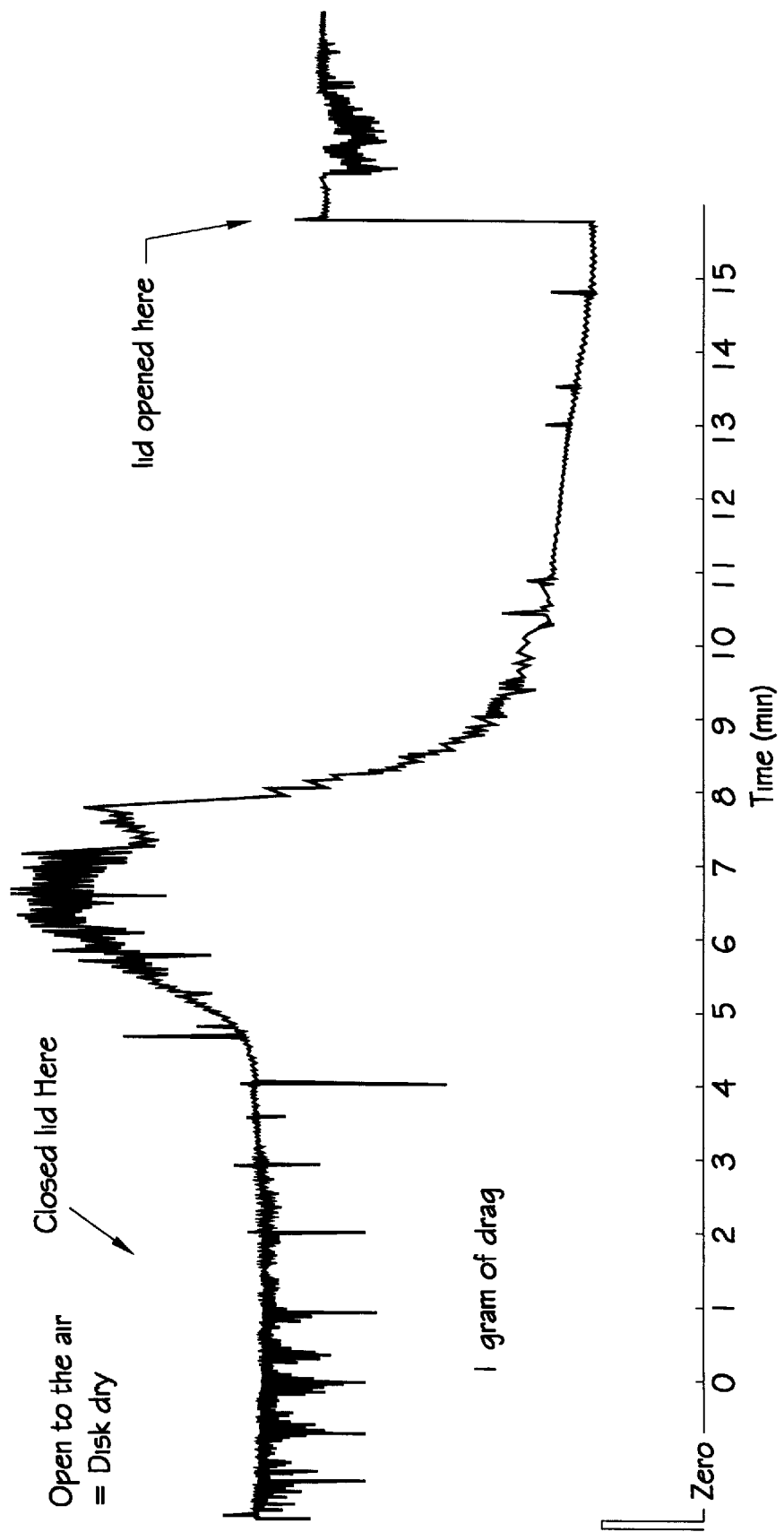
FIG. 6 is a graph showing the different drag experienced by a read/write head over the surface of a disk storage medium, where the drag is measured with and without a liquid bearing according to the subject invention.

The drag measurements are shown in FIG. 6 where drag as a function of time is plotted. Initially (before t=0), the drag was about 9 g. The drag is high and the sharp excursions in the trace before t=0 are evidence of high stick-slip phenomena. At t=0, the lid was placed on the tester, thereby sealing the tester. The drag remains high for several minutes and the stick-slip events continue. During this period, the liquid bearing material evaporates and the partial pressure of the fluid in the tester atmosphere increases. After about five minutes, the drag increases sharply. The inventors suggest that this may be due to a partial layer of fluid condensing on the disk, thereby raising the capillary forces between the head and the disk surface. Then, as the vapor phase approaches saturation with the liquid bearing, according to the method of the present invention a multiatomic layer of the fluid condenses on the surface of the disk, providing a lubricating fluid film at the head to disk interface. At this point the drag on the head is reduced to about 2 g. Additionally, the spiking due to stick-slip phenomena is no longer observed. Long term testing shows that this drag remains at the low level indefinitely. This test can be repeated by removing the lid of the tester, thus destroying the equilibrium multiatomic liquid bearing layer. This causes the drag to return to its initial value of about 9 g. When the lid is replaced, the data in FIG. 5 is repeated as the multiatomic layer of liquid bearing on the disk surface is re-established.

Figure 7:
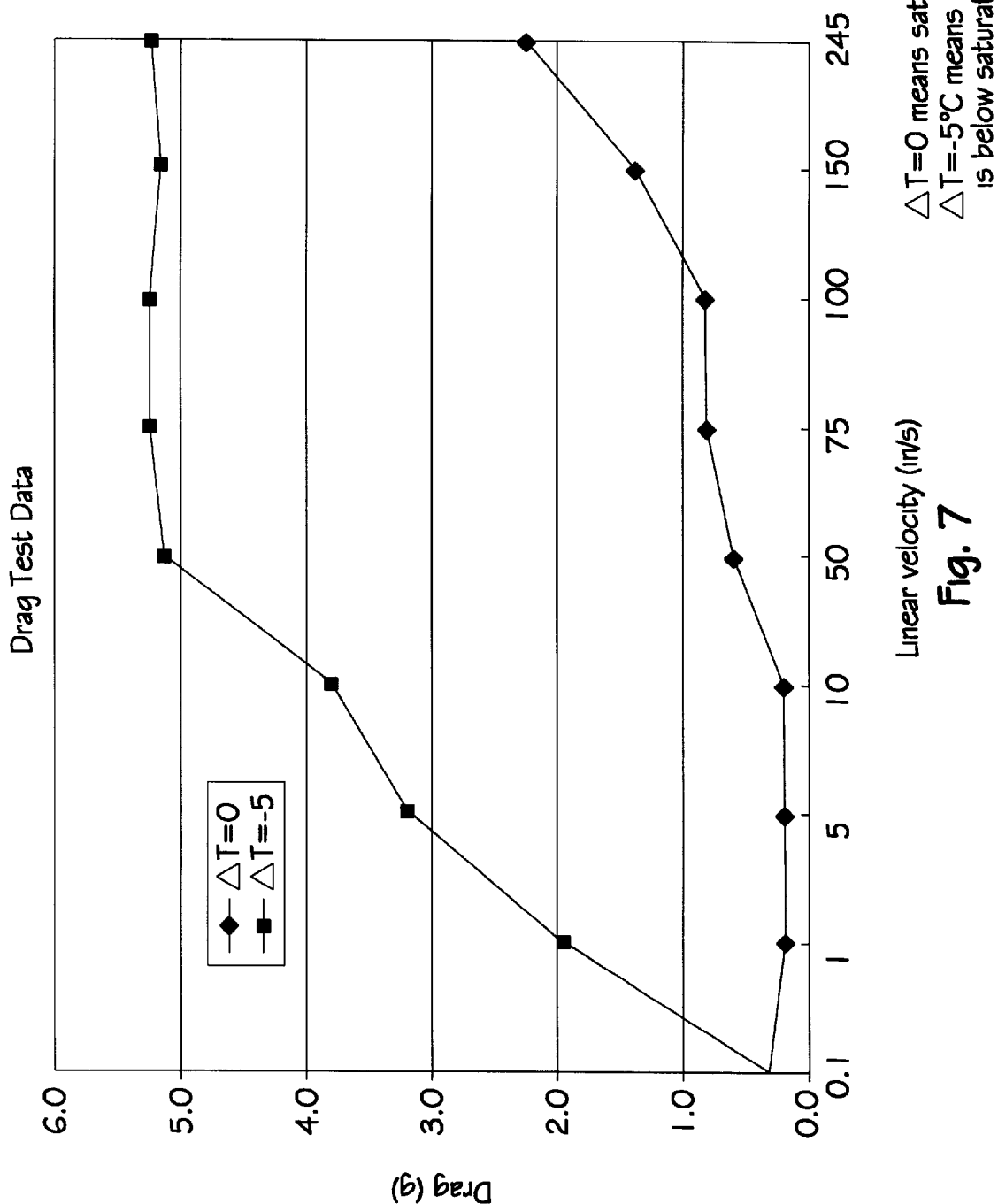
FIG. 7 is a graph of drag versus head-disk linear velocity for a saturated, and less than saturated, vapor phase liquid bearing.

FIG. 7 is a plot of drag versus linear velocity for an exemplary head in accordance with the present invention. In this experiment, the liquid reservoir was an aluminum block that could be cooled with a Peltier device. The temperature differential between the spin stand and reservoir was measured with a thermocouple.

The spin stand was maintained at room temperature at all times. The liquid bearing, in this case FC-77, was added to the reservoir and the spin stand was sealed. After equilibrium was reached, the drag was measured as a function of head-disk relative linear velocity, and this data is labeled $\Delta T=0$. This plot shows that the initial drag of the head is very low compared to a typical air bearing head, which would show a maximum in the low linear velocity region. Then, the Peltier device was turned on and the spin stand was re-equilibrated at a temperature differential of 5° C. The data, labeled $\Delta T=5$, shows that the drag increases significantly if the vapor is not saturated, which would move the vapor-disk surface equilibrium to the left on the absorption isotherm of FIG. 1b and the liquid bearing film thickness decreases.

Disk Drive Tests

Figure 8:
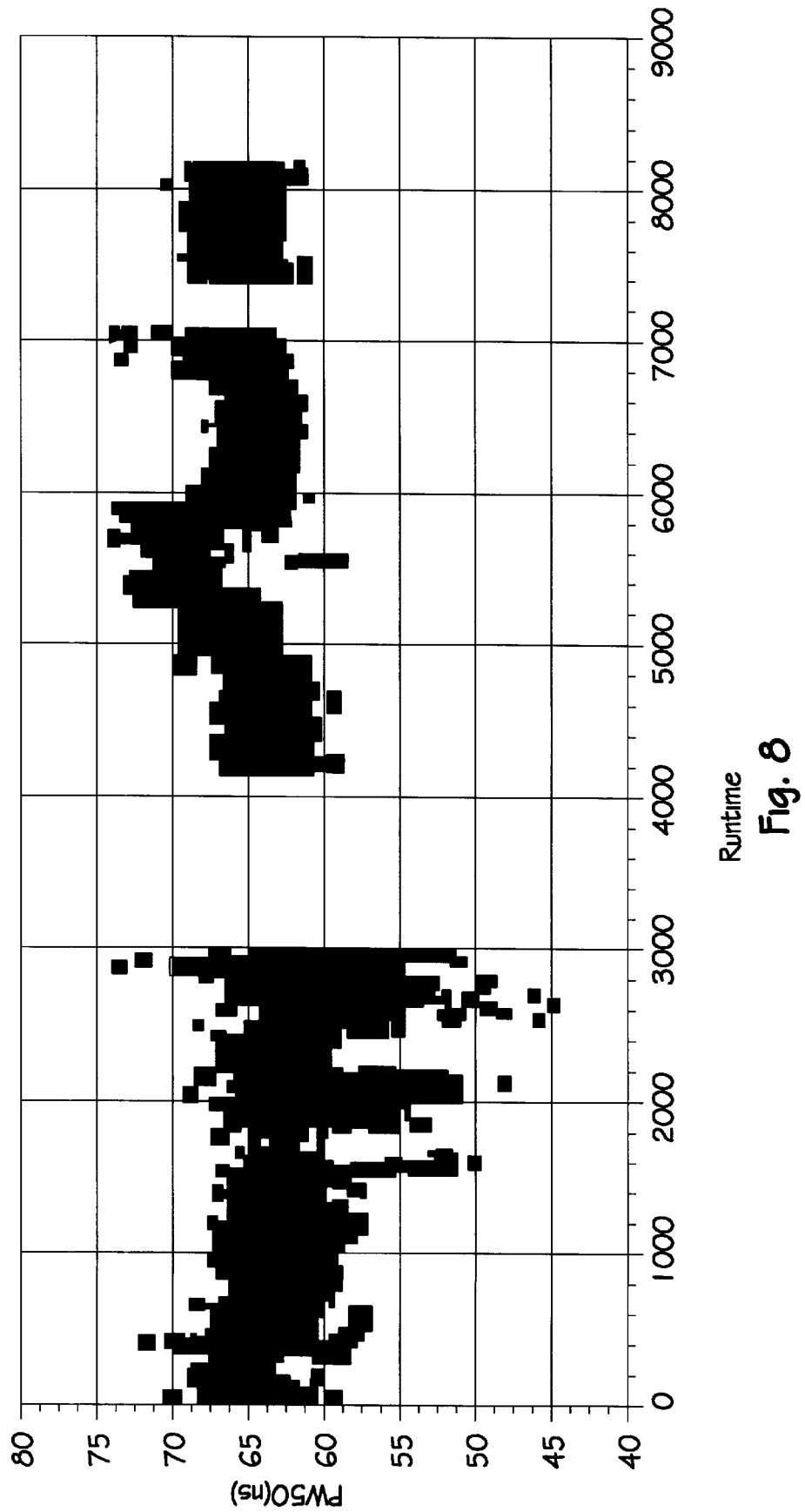
FIG. 8 provides PW50 performance data for a drive level start stop test using 2,2,4,4,6,8,8-heptamethylnonane plus 0.5% BHT as the liquid bearing in accordance with an alternative embodiment of the present invention.

Of particular importance is the stability of the head-disk spacing. Disk drive tests were performed to evaluate the head-disk spacing using a modified version of the storage system described in U.S. Pat. No. 5,559,650 as a test stand. The system was modified by removing the entire wick assemblies 210 and 212 as shown in the '650 patent. The heads were kept at the inner radius of the disk, i.e. at about 0.5 inches. The test was conducted using 2,2,4,4,6,8,8-heptamethylnonane plus a 0.5% by weight addition of the antioxidant 2,6-di-t-butyl-4-methylphenol (BHT) as the liquid bearing. The drive was operated in a continuous spinning mode at 3040 rpm by a computer controlled data acquisition system. After a preset time interval, a high frequency track was written to the disk. The readback amplitude was measured with a digital oscilloscope and recorded by the data acquisition system. Then a low frequency data track was written to the disk and the PW50 was measured and recorded. FIG. 8 represents the PW50 data for over 8000 hours of continuous operation and shows that the head to disk spacing has not materially changed during the entire test period.

Fly Height Measurement Experiments

Figure 9:
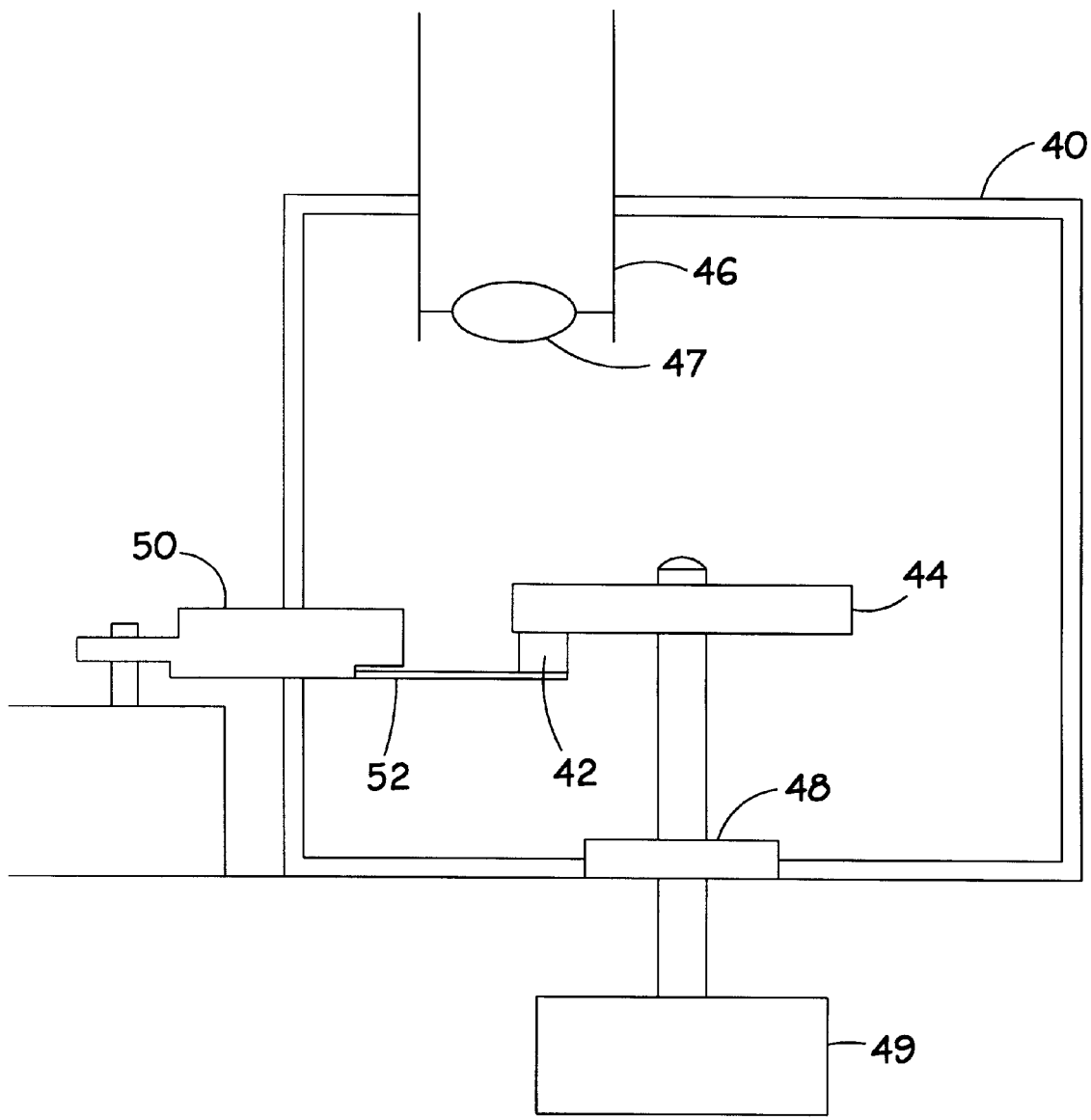
FIGS. 9 and 10 are side view schematic diagrams of the fly height measurement apparatus and optics geometry, respectively, used to measure the fly height achieved by storage systems in accordance with the present invention.
Figure 10:
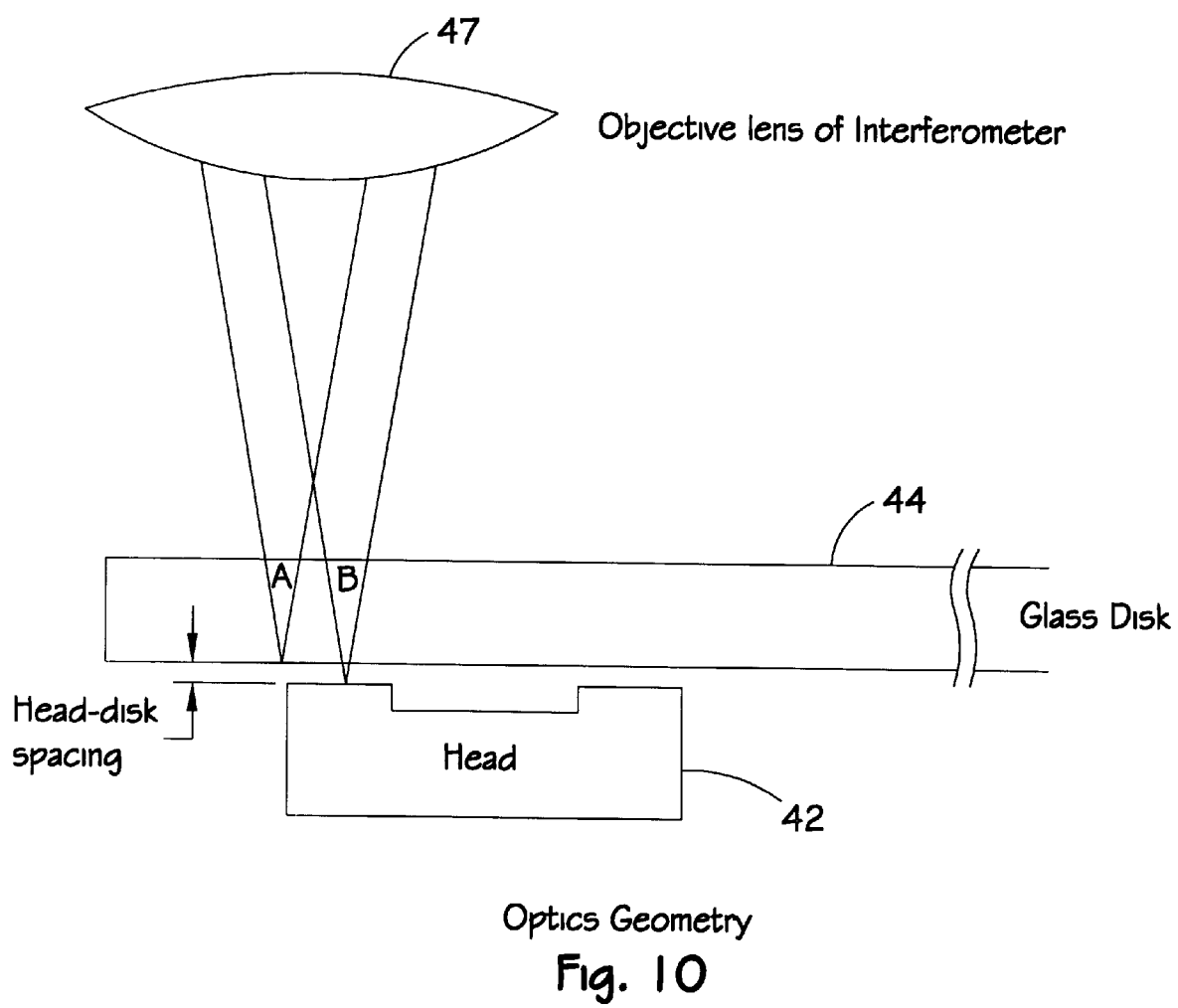

The head-disk spacing (or more commonly called the fly height) is usually measured by an optical technique such as interferometry (see B. Bushan, *Tribology and Mechanics of Magnetic Storage Devices*, 1990, Springer-Verlag, New York, cpt 9.2, p 765ff, and references therein, the disclosure of which is incorporated herein by reference). The introduction of a volatile liquid phase lubricant with spacing below $0.5\mu$ inch complicates the standard measurement techniques considerably. An instrument based on the laser heterodyne interferometric method described by Veillard et al. (D. H. Veillard, S. K. Ganapathi, and P. W. Smith, Trans MAG, 29(6), 3090 (1993), the disclosure of which is incorporated herein by reference) was used as illustrated in FIG. 9, with a modified optics geometry as shown in FIG. 10. A low volume, sealable spin stand 40 was used to contain the liquid bearing, test head 42, a glass disk 44, and the objective lens 47 of the interferometer optical assembly 46. The test head 42 is mounted on the mounting arm 50 via flexure 52. The glass disk 44 is rotated via air bearing spindle 48 driven by spindle motor 49.

Generally, the optics are employed where two light beams, reference beam A and signal beam B (as described by Veillard et al.), pass through the glass disk 44, as shown in FIG. 10. The reference beam A is focused on the lower surface of the glass disk 44. The signal beam B is focused on the surface of the head pad. The signal analysis technique is described by Veillard et al. To make a measurement, the disk rotation is stopped and the head 42 is allowed to settle on the glass disk 44, and the system is "zeroed." Then the spindle motor 49 is started and the change in signal due to the change in head disk spacing is recorded as the linear velocity under the head increases. The liquid bearing fluid was used in this experiment was D02TS (a PFPE, as shown in Table 1).

Figure 11:
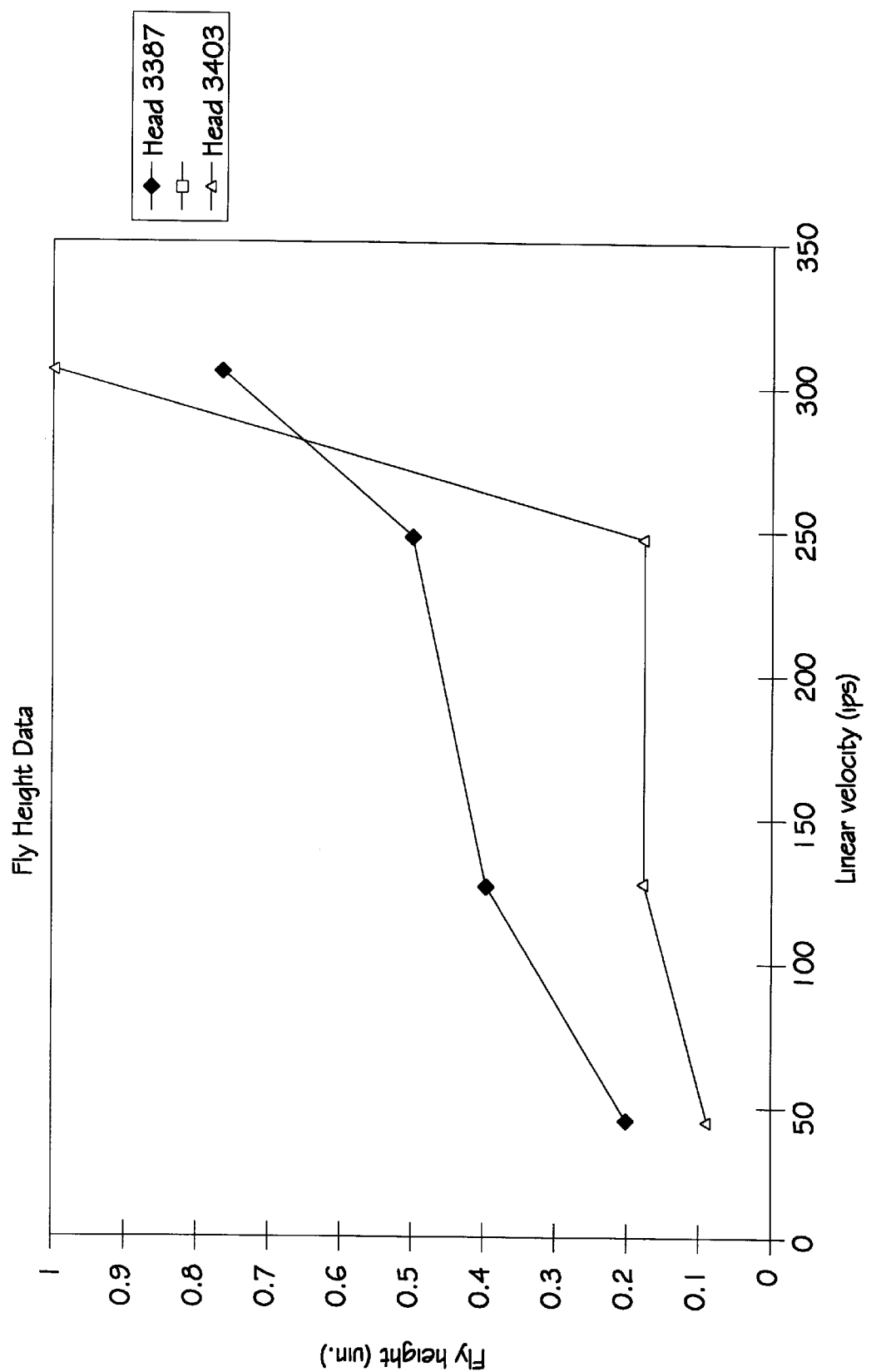
FIG. 11 is a graph depicting fly height versus linear velocity achieved by two embodiments of the storage system according to the present invention.

FIG. 11 depicts fly height data measurements obtained according to the present invention. As shown, desirable fly heights are achieved with the present invention, and fly heights lower than $0.5\mu$ inches are observed.

It is evident from the above results and discussion that improved information storage systems having liquid bearings are provided. Because the liquid bearings are maintained without means such as nozzles or wicks, the problems associated with the complexity of such means, such as assembly and the like, are avoided. In addition, because wicks or other similar means are not necessary, storage systems comprising a plurality of rigid storage mediums may be prepared. Furthermore, because the liquid bearing maintained on the disk surface is stable, the subject systems are amenable for use in a variety of applications, particularly in those applications where the system is not maintained in a stable environment, such as in a laptop computer. Finally, the subject invention provides for fly heights of less than about $1\mu$ inch, and usually less than about $0.5\mu$ inch on very smooth, polished, non-textured disks, providing for a significant improvement over the state of the art.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A disk for use in an information storage system characterized in that a liquid bearing comprising a low viscosity, high vapor pressure organic liquid layer is disposed on the surface of said disk and said liquid layer having a thickness of at least two molecular layers, and where the gaseous environment of said disk is saturated with respect to said low viscosity, high vapor pressure organic liquid layer and a non-Langmuir adsorption isotherm maintains the liquid layer having a thickness of at least two or more molecular layers on the surface of said disk.

2. The disk according to claim 1 wherein said liquid bearing has a viscosity ranging from about 0.1 to 10 cP at 25° C.

3. The disk according to claim 1 wherein said liquid bearing has a viscosity ranging from about 2 to 4 cP at 25° C.

4. The disk according to claim 1 wherein said liquid bearing has a vapor pressure ranging from about 0.001 to 500 Torr at 25° C.

5. The disk according to claim 1 wherein said liquid bearing has a vapor pressure ranging from about 0.01 to 100 Torr at 25° C.

6. The disk according to claim 1 wherein said liquid bearing has a vapor pressure ranging from about 0.05 to 5 Torr at 25° C.

7. The disk according to claim 1 wherein said liquid bearing is selected from the group of a non-Newtonian liquid, fluorocarbon and perfluoropolyether.

8. The disk according to claim 1 wherein said liquid bearing is 2,2,4,4,6,8,8-heptamethylnonane.

9. The disk according to claim 1 wherein said liquid bearing is comprised of a mixture of 2,2,4,4,6,8,8-heptamethylnonane and between 0.01 and 1% by weight of 2,6-di-t-butyl-4-methyl phenol (BHT).

10. The disk according to claim 1 wherein the surface of said disk is a smooth, polished, non-textured surface.

11. A disk drive having the disk of claim 1 and further comprising:
a sealed housing having an interior;
an actuator;
at least one read/write head having a read/write element mounted on said actuator;
a motor for rotating said disk; and
a controller for providing control signals to the actuator for positioning said read/write head and reading data from, and writing data to, said disk.

12. The disk drive of claim 11 wherein said liquid bearing has a viscosity ranging from about 2 to 4 cP at 25° C.

13. The disk drive of claim 11 wherein said liquid bearing has a vapor pressure ranging from about 0.01 to 100 Torr at 25° C.

14. The disk drive of claim 11 wherein said liquid bearing is selected from the group of a non-Newtonian liquid, fluorocarbon and perfluoropolyether.

15. The disk drive of claim 11 wherein said liquid bearing is 2,2,4,4,6,8,8-heptamethylnonane.

16. A disk for use in an information storage system, comprising:

means for lubricating the disk with a liquid bearing means;

said liquid bearing means comprising a low viscosity, high vapor pressure organic liquid layer disposed on the surface of the disk and said liquid layer having a thickness of at least two molecular layers, and where the gaseous environment of the disk is saturated with respect to said liquid bearing means and a non-Langmuir adsorption isotherm maintains said liquid bearing means having a thickness of at least two or more molecular layers on the surface of the disk.

17. The disk of claim 16 wherein said liquid bearing is selected from the group of a non-Newtonian liquid, fluorocarbon and perfluoropolyether.

18. The disk of claim 16 wherein said liquid bearing is 2,2,4,4,6,8,8-heptamethylnonane.

* * * * *